May 9, 1933.  M. W. McCONKEY  1,908,435
BRAKE APPLYING MEANS
Original Filed Nov. 4, 1927
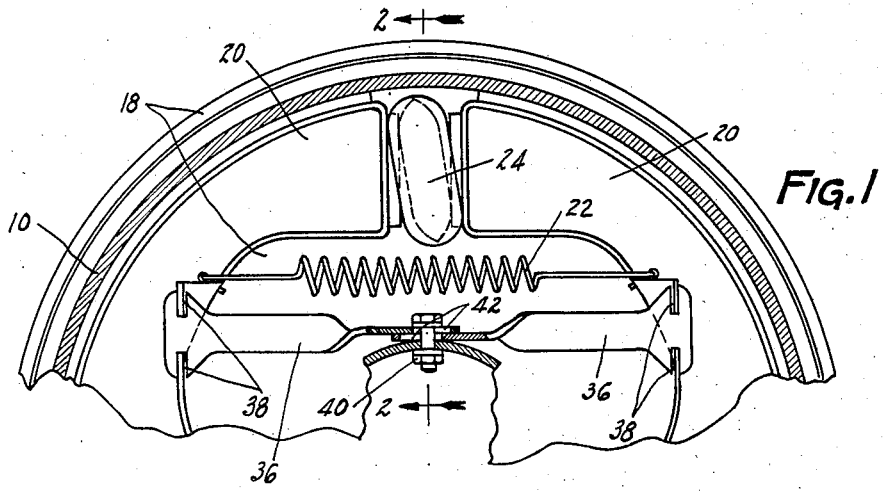
FIG. 1
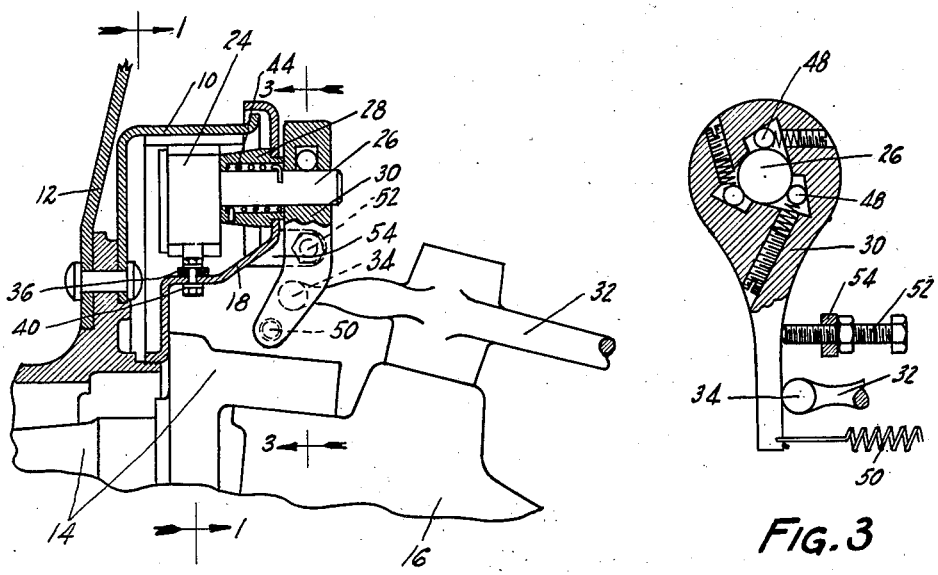
FIG. 2
FIG. 3
INVENTOR
Montgomery W. McConkey Patented May 9, 1933

1,908,435

UNITED STATES PATENT OFFICE

MONTGOMERY W. McCONKEY, OF SOUTH BEND, INDIANA, ASSIGNOR TO BENDIX BRAKE COMPANY, OF SOUTH BEND, INDIANA, A CORPORATION OF ILLINOIS

BRAKE-APPLYING MEANS

Application filed November 4, 1927, Serial No. 230,961. Renewed July 30, 1932.

This invention relates to brakes, and is illustrated as embodied in an internal expanding brake for a front automobile wheel. An object of the invention is to provide improved means for adjusting the brake for wear, preferably automatically.

One feature of the invention relates to the adjustment of the brake shoes, or equivalent friction means, to compensate for wear and preserve a predetermined clearance with respect to the brake drum when in released position, by means of one or more tension elements permitting a predetermined brake-applying movement of the shoes and then shifted lengthwise to adjust them. Preferably the cam or other applying device is held in engagement with the shoes, for example by a spring light enough to be overcome by the return spring of the brake, so that the cam automatically follows the adjusted released position of the friction means.

Whether or not the particular type of brake adjustment described above is utilized, I prefer to provide one-way connection between an operating lever, or an equivalent operating device, and the applying device of the brake, for example by providing a roller clutch connecting the lever with the cam shaft of the brake. Thus the lever can operate the shaft in a brake-applying direction, but can move independently of the shaft to released position. This permits returning the lever to a predetermined released position, for example by a spring urging it against an adjustable stop, regardless of the brake adjustment.

The above and other objects and features of the invention, including various novel combinations of parts and desirable particular constructions, will be apparent from the following description of one illustrative embodiment shown in the accompanying drawing, in which:

Figure 1 is a vertical section through the upper part of the brake, just inside of the head of the brake drum, and showing the brake shoes in side elevation;

Figure 2 is a vertical section through the upper part of the brake on the line 2—2 of Figure 1, and looking rearwardly at the right front brake; and Figure 3 is a section through the operating lever on the line 3—3 of Figure 2.

The illustrated brake comprises a drum 10, rotating with a wheel 12 mounted on a front knuckle 14 swiveled or pivoted in any desired manner at the end of the front axle 16. At the open side of drum 10 there is shown a backing plate 18 carried by the knuckle 14. Within the drum are illustrated the upper ends of brake shoes 20, constituting the friction means of the brake, and which may, if desired, be formed and arranged substantially as fully described in Patent Number 1,567,716, granted Bendix Brake Company on December 29, 1925.

The shoes are forced apart, against the resistance of a return spring 22, by an applying device such as a cam 24, which may, if desired, be integral with a cam shaft 26 journaled in a bracket 28 secured to the backing plate 18 and having an operating device such as a lever or crank 30. The brake as illustrated is intended to be applied by a lever 32 fulcrumed on the axle 16 and having at its end an integral ball 34 engaging the lever 30 and arranged, when the brake is applied, with its center in or immediately adjacent the swiveling axis of the wheel.

In order to adjust the released position of the friction means, automatically to compensate for wear, the shoes 20 may be provided with tension elements or links 36, formed with notches 38 permitting a predetermined brake-applying motion of the shoes without disturbing the setting of the elements 36. Elements 36 have their adjacent ends superposed (see Figure 2) and slotted to receive a nut and bolt, or other clamping means 40 frictionally holding the ends of these elements and resisting movement of them. As the shoes wear in service, the elements 36 are gradually shifted lengthwise outwardly to cause the spring 22 always to move the shoes 20 to released positions affording them a predetermined clearance with respect to the drum 10.

In order to hold the cam 24 or its equivalent always against the shoes, regardless of their adjustment, I prefer to provide a torsion spring 44, connected at one end to shaft 26 and at its other end to bracket 28, and urging cam 24 in a brake-applying direction. Spring 44 is lighter than spring 22, and is therefore overcome by spring 22 when the brake is released, until the shoes 20 reach their released positions, but causes cam 24 to follow the adjusted positions of the shoes.

Lever 30 is preferably connected to shaft 26 by a one-way connection such as a roller or "Horton" clutch 48, so that the lever operates the shaft whenever moved in a brake-applying direction but can return to released or idle position independently of the shaft. Means, such as a spring 50 connected at one end to lever 30 and at its other to the backing plate 18, serves to return the lever 30 to its idle position, and this position may be determined by a device such as an adjustable stop 52 threaded through a lug 54 on the backing plate 18 and engaged by lever 30 when in released position.

While one illustrative embodiment has been described in detail, it is not my intention to limit the scope of the invention to that particular embodiment, or otherwise than by the terms of the appended claims.

I claim:

1. A brake comprising, in combination, friction means having oppositely-movable portions, a pair of tension elements operatively engaged and shifted lengthwise by said portions after a predetermined brake-applying movement, and means resisting any shifting of said elements.

2. A brake comprising, in combination, friction means having oppositely-movable portions, a pair of tension elements operatively engaged and shifted lengthwise by said portions after a predetermined brake-applying movement, and a friction gripping device holding said elements.

3. A brake comprising, in combination, a retarding member, a tension element engaging said member and shifted lengthwise by said member after a predetermined brake-applying movement, a spring for restoring said member, and friction gripping device holding said element against shifting, said device exerting a frictional force sufficient to resist the restoring force of the spring but insufficient to resist the applying force of said member.

4. A brake comprising, in combination, a retarding member, a tension element engaging said member and shifted lengthwise by said member after a predetermined brake-applying movement, a spring for restoring said member, and a friction means yieldingly gripping said element and resisting shifting of said element, said means exerting a frictional force sufficient to resist the restoring force of the spring but insufficient to resist the applying force of said member.

5. A brake comprising, in combination, friction means, means determining the released position of the friction means and which is automatically adjusted by the operation of the brake to compensate for wear of the friction means, an applying device acting on the friction means, means constantly holding the applying device in adjusted operative position with respect to the friction means in released position, an operating device for the applying device, and means for returning the operating device to a predetermined position when the brake is released, in any adjustment of the applying device.

6. A brake comprising, in combination, friction means, means determining the released position of the friction means and which is automatically adjusted by the operation of the brake to compensate for wear of the friction means, a cam operatively engaging the friction means, a spring urging the cam angularly into constant engagement with the friction means regardless of its adjustment, an operating device for the cam, and means for returning the operating device to a predetermined position when the brake is released, in any angular released position of the cam.

7. A brake comprising, in combination, friction means, means for adjustably determining the released position of the friction means, a relatively heavy spring urging the friction means toward released position, an applying device, a lighter spring urging the applying device in a brake-applying direction into engagement with the friction means, and an operating device for the applying device which is automatically returned to a predetermined initial position when the brake is released, independently of the released position of the applying device.

8. A brake comprising, in combination, a drum, friction means engageable with the drum, means for adjustably and automatically predetermining the released position of the friction means to give constant clearance with respect to the drum as the friction means wears, a spring urging the friction means toward the released position determined by the second means, a cam operatively engaging the friction means, a spring urging the cam in a brake-applying direction and which spring is weak enough to be overcome by the first spring, and an operating device for the cam which is automatically adjusted to compensate for the turning of the cam in released position due to the adjustment of the released position of the friction means.

9. A brake comprising, in combination, a drum, friction means engageable with the drum, means for adjustably and automatically predetermining the released position of the friction means to give constant clearance with respect to the drum as the friction means wears, a spring urging the friction means toward the released position determined by the second means, an applying device operatively engaging the friction means, a spring urging the applying device in a brake-applying direction and which spring is weak enough to be overcome by the first spring, and an operating device for the applying device which is automatically adjusted to compensate for the adjustment of the released position of the friction means.

10. A brake comprising, in combination, a drum, friction means engageable with the drum, means for adjustably and automatically predetermining the released position of the friction means to give constant clearance with respect to the drum as the friction means wears, a spring urging the friction means toward the released position determined by the second means, a cam operatively engaging the friction means, and a spring urging the cam in a brake-applying direction and which spring is weak enough to be overcome by the first spring.

11. A brake comprising, in combination, a drum, friction means engageable with the drum, means for adjustably and automatically predetermining the released position of the friction means to give constant clearance with respect to the drum as the friction means wears, a spring urging the friction means toward the released position determined by the second means, and applying device operatively engaging the friction means, and a spring urging the applying device in a brake-applying direction and which spring is weak enough to be overcome by the first spring.

12. A brake-applying device comprising, in combination, a brake applying shaft, a lever having operative connection with the shaft when moved in a brake-applying direction and movable independently of the shaft in the opposite direction, a device for limiting the movement of the lever in said opposite direction, and means yieldingly urging the lever in said opposite direction, together with a spring urging the shaft in a brake-applying direction as far as permitted by the brake in its released position.

13. A brake-applying device comprising, in combination, a brake applying shaft, a lever having operative connection with the shaft when moved in a brake-applying direction and movable independently of the shaft in the opposite direction, an adjustable stop for limiting the movement of the lever in said opposite direction, and means yieldingly urging the lever in said opposite direction, together with a spring urging the shaft in a brake-applying direction as far as permitted by the brake in its released position.

14. A brake comprising, in combination, friction means having oppositely movable portions and a pair of interconnected tension elements operatively engaged and shifted lengthwise by said portions after a predetermined brake applying movement, and means comprising a bolt resisting any shifting of said elements.

15. A brake comprising, in combination, friction means having oppositely movable portions, a pair of interconnected substantially flat striplike tension elements operatively engaged and shifted lengthwise by said portions after a predetermined brake applying movement and a friction gripping device comprising a bolt and nut construction for holding said elements together and permitting said lengthwise shifting.

16. A brake comprising, in combination, friction means having oppositely movable portions, said portions provided with fastening means projecting therefrom, a pair of tension elements operatively engaged and shifted lengthwise by said portions being connected to said fastening members, together with means including a bolt member passing through said elements, the latter being so constructed and arranged with respect to said bolt as to obviate reverse shifting of said elements.

17. A brake comprising, in combination, friction means having oppositely movable portions, a pair of stampings slotted at their ends and fitting in projections on said portions, each of said stampings having superposed slots at adjacent ends, together with a bolt member frictionally passing through said slots and frictionally gripping the sides thereof to hold said elements in their position of adjustment.

18. A brake comprising, in combination, a retarding member, a tension element engaging said member and shifted lengthwise by said member after a predetermined brake applying movement, said element being slotted at its end to accommodate a bolt member holding said element against shifting in the reverse direction.

19. A brake comprising a pair of shoes, means affording a lost motion connection with each shoe for proper release movement, each means including a flat strip having a slot therein, common means passing through said slots for frictionally holding said strips to a support.

20. A brake comprising a support, friction means, means having a lost motion connection with said friction means at at least two points, said means comprising overlapped strips and adjusting means for frictionally holding said strips in overlapped position to said support.

21. In a brake release positioning means comprising a support, a pair of overlapped slotted strips frictionally secured to said support, and lost motion means adapted to connect said strips to a friction means.

22. A brake comprising a support, a friction shoe, a strip frictionally secured to said support and adapted for substantially radial and longitudinal movement for adjustment with respect to said support, and a lost motion connection means between said strip and said shoe to restrict clearance movement of said shoe.

23. In a brake release positioning means, a support, a pair of overlapping strips, and means adapted to frictionally engage said strips with said support.

24. In a brake, a friction stop comprising an adjusting unit acting on two shoes for adjustment independent of each other.

25. In a brake, a friction stop comprising an adjusting unit frictionally secured to a support and acting on two shoes for adjustment independent of each other.

In testimony whereof I have hereunto signed my name.

MONTGOMERY W. McCONKEY.